(12) United States Patent
Okada et al.

(10) Patent No.: US 9,323,015 B2
(45) Date of Patent: Apr. 26, 2016

(54) PROCESS TO ALIGN SLEEVE MEMBER OPTICALLY WITH OPTICAL DEVICE

(75) Inventors: Takeshi Okada, Yokohama (JP); Kazunori Yoshida, Yokohama (JP)

(73) Assignee: SUMITOMO ELECTRIC DEVICE INNOVATIONS, INC., Kanagawa (JP)

( * ) Notice: Subject to any disclaimer, the term of this patent is extended or adjusted under 35 U.S.C. 154(b) by 308 days.

(21) Appl. No.: 13/576,374

(22) PCT Filed: Dec. 12, 2011

(86) PCT No.: PCT/JP2011/079267
§ 371 (c)(1),
(2), (4) Date: Jul. 31, 2012

(87) PCT Pub. No.: WO2012/081714
PCT Pub. Date: Jun. 21, 2012

(65) Prior Publication Data
US 2012/0304435 A1    Dec. 6, 2012

(30) Foreign Application Priority Data

Dec. 13, 2010    (JP) ................................ 2010-276740

(51) Int. Cl.
*B23Q 17/00*    (2006.01)
*G02B 6/42*    (2006.01)

(52) U.S. Cl.
CPC ............ *G02B 6/4263* (2013.01); *G02B 6/4227* (2013.01); *G02B 6/421* (2013.01); *G02B 6/4204* (2013.01); *G02B 6/4208* (2013.01); *G02B 6/4292* (2013.01); *Y10T 29/49778* (2015.01)

(58) Field of Classification Search
CPC ............ G02B 6/421; G02B 6/04; G02B 6/08; G02B 6/4227; G02B 6/4263; G02B 6/4292; G02B 6/4208; G02B 6/4204; Y10T 29/49778; G06G 1/14; G06G 1/0052; G01C 21/02
USPC ......... 29/407.04; 33/1 SD; 385/53, 88, 92–94
See application file for complete search history.

(56) References Cited

U.S. PATENT DOCUMENTS 3,391,392 A * 7/1968 Doyle .................... A41H 3/007
                                                    318/568.1
5,167,072 A * 12/1992 Richardson .................... 33/1 SD (Continued)

FOREIGN PATENT DOCUMENTS

CN    1255646 A    6/2000
CN    1360706 A    7/2002

(Continued)

OTHER PUBLICATIONS

Wakasaki et al. Machine Translation of JP 2009 133962 A Jun. 2009 Japan.*

(Continued)

*Primary Examiner* — Jacob J Cigna
*Assistant Examiner* — Lee A Holly
(74) *Attorney, Agent, or Firm* — Global IP Counselors, LLP

(57) ABSTRACT

A method to assemble an optical assembly is disclosed. The method includes steps of rough and fine alignment between the sleeve member and the J-sleeve, and the alignment of the J-sleeve with the optical device. The rough alignment slides the sleeve member on the J-sleeve as tracing closed loops concentric to each other by alternating a direction of the slide in clockwise and counter clockwise in respective loops.

8 Claims, 5 Drawing Sheets

(56) References Cited

U.S. PATENT DOCUMENTS

| | | | |
|---|---|---|---|
| 5,666,450 A | 9/1997 | Fujimura et al. | |
| 6,157,012 A | 12/2000 | Tanaka et al. | |
| 2002/0081075 A1* | 6/2002 | Miyazaki | 385/49 |
| 2005/0185882 A1 | 8/2005 | Zack et al. | |
| 2007/0256774 A1* | 11/2007 | Tsuno et al. | 156/64 |
| 2009/0116838 A1* | 5/2009 | Kihara | 398/79 |
| 2009/0304337 A1* | 12/2009 | Sato | 385/92 |

FOREIGN PATENT DOCUMENTS

| | | |
|---|---|---|
| JP | H02-030911 U | 2/1990 |
| JP | H9-061752 A | 9/1997 |
| JP | 2003-279800 A | 10/2003 |
| JP | 2004-264754 A | 9/2004 |
| JP | 2009-093041 A | 4/2009 |
| JP | 2009133962 A * | 6/2009 |
| WO | WO-2009-069572 A1 | 6/2009 |

OTHER PUBLICATIONS

Chinese Office Action of the corresponding Chinese Patent Application No. 201180009306.8, dated Jan. 24, 2014.

Notification of Reasons for Rejection of the corresponding Japanese Patent Application No. 2010-276740, dated Dec. 2, 2014.

* cited by examiner

PROCESS TO ALIGN SLEEVE MEMBER OPTICALLY WITH OPTICAL DEVICE

CROSS-REFERENCE TO RELATED APPLICATIONS

This U.S. National stage application claims priority under 35 U.S.C. §119(a) to Japanese Patent Application No. 2010-276740, filed in Japan on Dec. 13, 2010, the entire contents of which are hereby incorporated herein by reference.

TECHNICAL FIELD

The present invention relates to a process to manufacture an optical assembly to transmit an optical signal or to receiving an optical signal, in particular, the invention relates to a process to align a sleeve member with an optical device.

BACKGROUND ART

An optical assembly applicable to the optical communication system generally includes, as shown in FIG. 4, a sleeve member 2, an optical device, and a joint sleeve (hereafter denoted as J-sleeve). The sleeve member guides an optical ferrule attached in a tip end of an external optical fiber to couple the external optical fiber with the optical device. The optical device 3, which converts signals between an electrical form and an optical form, is inserted into the J-sleeve 4 to couple with the external fiber. The J-sleeve 4 makes the optical device 3 optically coupling with the sleeve member 2.

The optical alignment of the optical assembly 1 shown in FIG. 4 may be carried out by s steps, one of which is the alignment along the optical axis Z and the other is the alignment within the plane perpendicular to the optical axis Z. The former alignment, which is often called as the Z-alignment, is performed by adjusting an insertion depth of the optical device 3 within a bore 4c of the J-sleeve 4. Because the outer diameter of the optical device in the cap 3a thereof is slightly smaller than a diameter of the bore 4c, the adjustment of the optical device 3 within the bore 4c along the optical axis Z may be easily carried out.

The latter alignment, which is often called as the XY-alignment, may be performed by sliding the sleeve member 2 on the flat end 4b of the J-sleeve 4. Because the stub 2b in the center of the sleeve 2a and the holder 2c that press-fits the stub 2b therein and is press-fit within the gap between the cover 2d and the sleeve 2a; the lateral movement of the sleeve member 2 on the flat end 4b of the J-sleeve 4 is equivalent to move the sleeve 2a and the stub 2b with respect to the longitudinal axis of the optical device. Thus, the XY-alignment between the sleeve 2a and the optical device 3 may be performed.

The XY-alignment described above is often carried out by two procedures, one of which is the rough alignment and the other is fine alignment. The rough alignment moves the sleeve member 2 widely in a region on the flat end 4b to estimate a position where a maximum optical coupling efficiency between the sleeve member 2 and the optical device is obtained; then, a fine alignment is performed to slide the sleeve member 2 finely from the position above to find the optimum point at which the optical coupling efficiency between two members, 2 and 3, becomes maximum. Because the Z-alignment shows a larger tolerance compared to the XY-alignment, the Z-alignment is generally performed after the XY-alignment and two members, 2 and 3, are permanently fixed by, for instance, the YAG laser welding. The optical device 2 is fixed to the J-sleeve 4 by the laser welding or the like.

The rough alignment between two processes generally takes a dominant tact time. That is, the rough alignment often adopts, what is called, the spiral alignment as shown in FIG. 5 where a starting point $P_0$ where a substantial coupling is available is empirically selected first; then the sleeve member 2 is spirally moved in counter clockwise as tracing concentric squares to find the position where a maximum coupling is obtained.

However, the spiral alignment above described often causes a rotation of the J-sleeve 4 with respect to the optical device 3. When the optical assembly 1 implements the optical isolator 5, especially in a case where the optical isolator is assembled in the J-sleeve 4, the rotation of the J-sleeve 4 during the rough alignment misaligns the optical isolator 5 with the polarization direction of the LD 3c. The LD 3c has the polarization direction of the light emitted therefrom in parallel to the stacking direction of the semiconductor layers when it has a type of the edge-emitting arrangement. Thus, the un-intentional rotation of the isolator around the optical axis Z may lower the optical coupling efficiency between the optical device 3 and the external optical fiber set in the optical sleeve 2a. The present invention is to provide a method to align the J-sleeve 4 with the optical device 3 without inducing the rotation thereof.

SUMMARY OF INVENTION

The invention of the present application relates to a method to manufacture an optical assembly. The optical assembly includes a sleeve member, a J-sleeve, and an optical device. The manufacturing method includes steps of: (1) roughly aligning the sleeve member with the J-sleeve; (2) finely aligning the sleeve member with the J-sleeve; and (3) aligning the J-sleeve with the optical device. A feature of the method is that the rough alignment of the sleeve member with the J-sleeve includes a step to slide the sleeve member on the J-sleeve as tracing closed loops concentric to each other by alternating the direction of the slide in clockwise and counter clockwise in respective closed loops.

BRIEF DESCRIPTION OF DRAWINGS

Non-limiting and non-exhaustive embodiments of the present invention will be described with reference to the following figures, wherein like reference numerals refer to like parts throughout the various figures unless otherwise specified.

DESCRIPTION OF EMBODIMENTS

Details of an optical assembly according to an embodiment of the present invention will be described as referring to FIG. 1. The optical assembly of the present embodiment has a feature in a method to align optical axis Z thereof. The optical assembly includes members similar to or same as those shown in FIG. 4.

Figure 1:
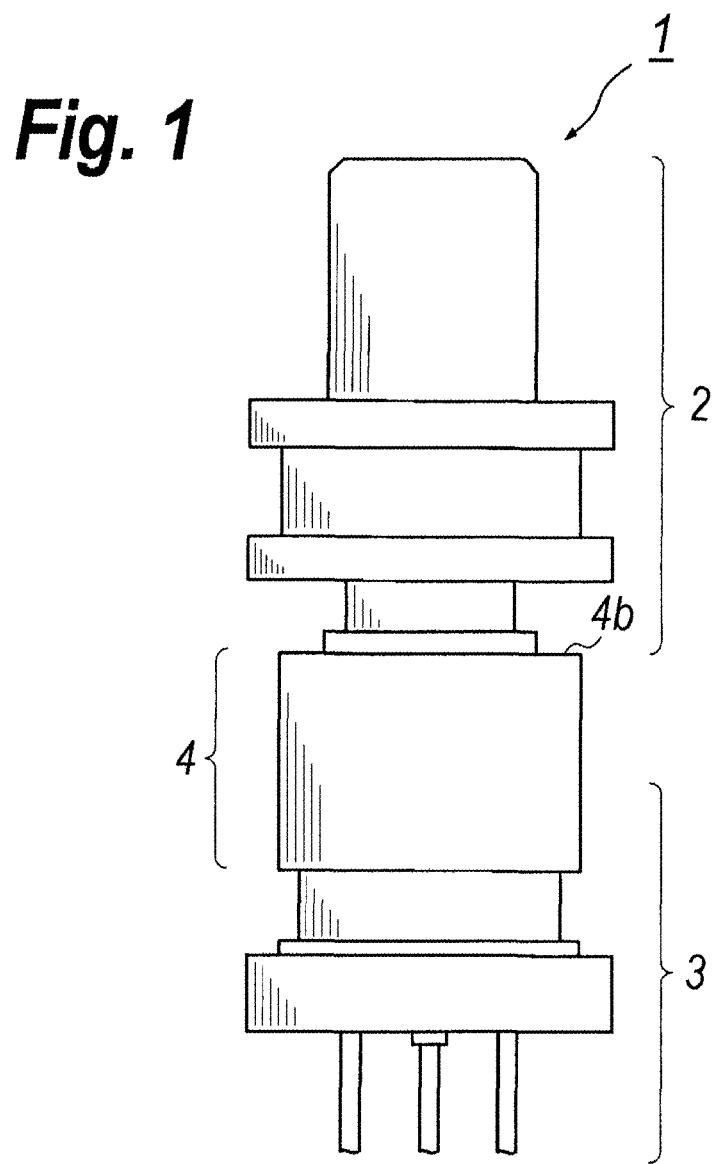
FIG. 1 is a side view of an optical assembly according to an embodiment of the present invention.
Figure 4:
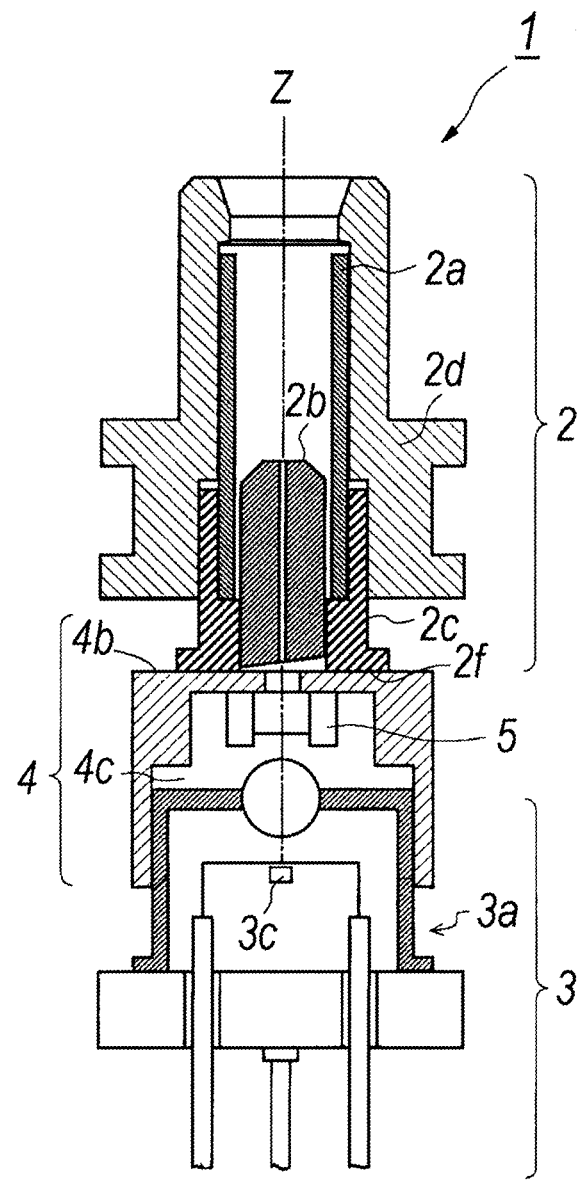
FIG. 4 is a cross section of a conventional optical assembly.
Figure 5:
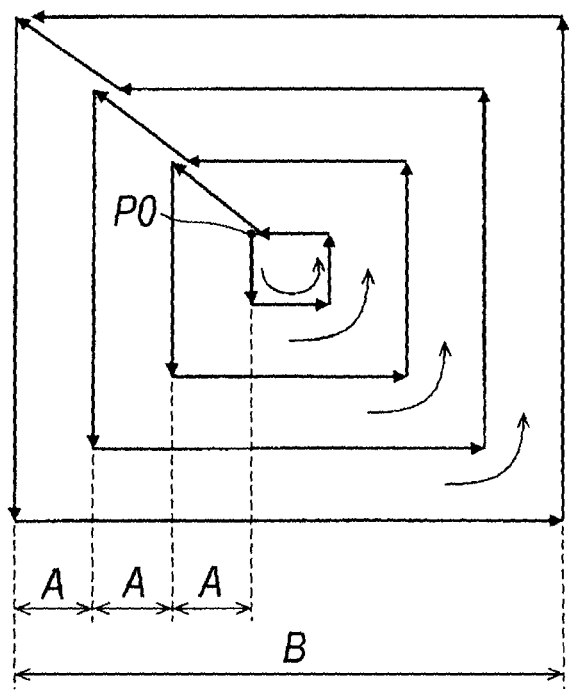
FIG. 5 shows a trace of the sleeve member in the rough alignment generally used in a conventional alignment process.

The optical assembly 1 illustrated in FIG. 1 includes an optical device 3 that implements an LD 3c, which should be referred to FIG. 4, a sleeve assembly 2 to receive an external optical connecter, and a joint sleeve 4 (hereafter denoted as J-sleeve). The J-sleeve 4, as illustrated in FIG. 4, includes a bore into which the optical device 3 is set and a flat end 4b to which the sleeve member 2 is fixed. Adjusting the insertion of the optical device 3 into the bore 4c, the optical alignment along the optical axis Z may be carried out, meanwhile, sliding the sleeve member 2 on the flat end 4b of the J-sleeve 4 may carry out the optical alignment between the sleeve member 2 and the optical device 3 in the plane perpendicular to the optical axis Z may be performed.

Figure 2:
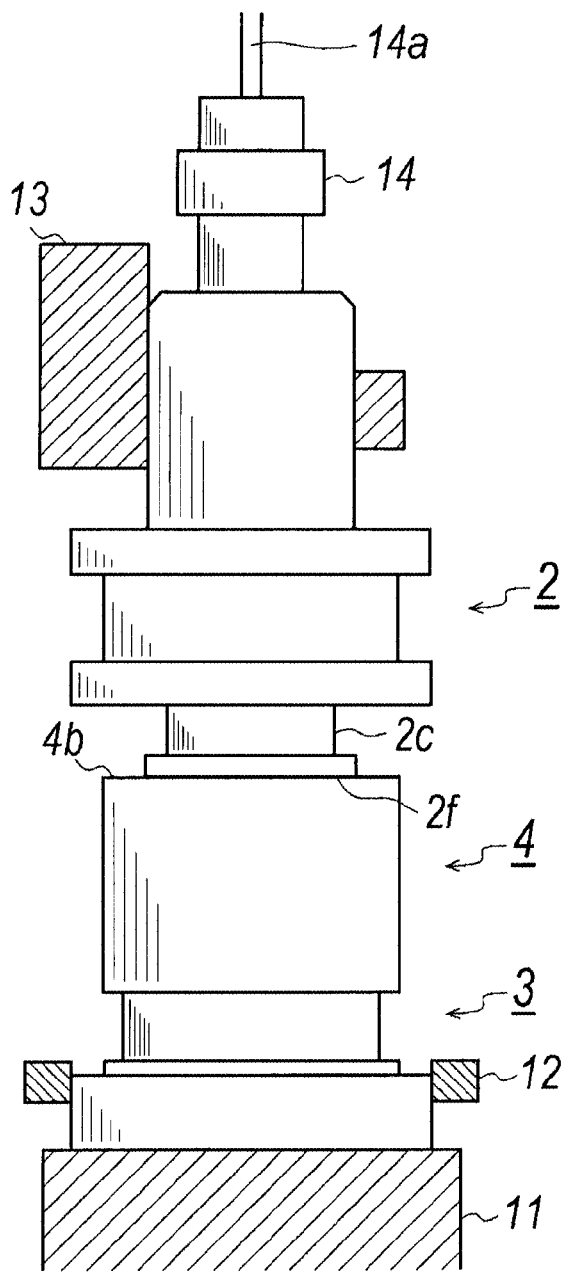
FIG. 2 shows a process to align the sleeve member supported by the upper chuck with the optical device supported by the lower chuck.

FIG. 2 illustrates a process to align optically between the sleeve member 2 and the optical device 3, specifically, FIG. 2 is a side view of an alignment apparatus of the optical assembly 1. The alignment apparatus includes a mount 11 on which the optical devices 3 is set, a lower chuck 12 to hold the optical device 3 on the mount, an upper chuck 13 to hold the sleeve member 2, where the upper chuck 13 is movable in the plane perpendicular to the optical axis Z, and an external optical connector 14 with an optical fiber 14a, where an optical power meter, which is not shown in FIG. 2, is coupled with a far end of the optical fiber 14a.

The process to assemble the optical assembly 1 will be described. The process first holds the optical device 3 on the mount 11 by the lower chuck 12, then the J-sleeve 4 covers the optical device 3 such that the tip of the optical device 3 is inserted into the bore 4c as rotating the J-sleeve around the optical axis Z to align the direction to the optical isolator 5 with respect to the optical device 3. Specifically, when the LD 3c has a type of, what is called, the edge emitting arrangement, the polarization direction of light emitted from the LID 3c is in parallel to the extending direction of the semiconductor layers constituting the laser structure of the LD 3c, which is in parallel to the page of FIG. 4. Accordingly, the direction of the isolator 5 is necessary to align with the polarization direction of the LD 3c by rotating the J-sleeve 4 around the axis of the optical device 3.

The process next supports the sleeve member 2 by the upper chuck 13, where the sleeve member is assembled with the optical connector 14 in advance to the support, and makes the sleeve member 2 close to the J-sleeve 4. Because the sleeve member 2 in a primary portions thereof and the J-sleeve 4 are made of magnetic material, the J-sleeve 4 may be lifted up by the magnetic force applied to the upper chuck 13 when the upper chuck 13 makes close to the J-sleeve 4, and the end surface 2f of the sleeve member 2 is in contact with the flat end 4b of the J-sleeve 4. Thus, the upper chuck 13 is forced to be close to the J-sleeve 4 to realize such a positional relation between the sleeve member 2 and the J-sleeve.

Next, the process may rough align between the sleeve member 2 and the J-sleeve 4 in the plane perpendicular to the optical axis Z. Specifically, first the process slides the sleeve member 2 on the flat end 4b of the J-sleeve 4 to draw a plurality of ringed traces with a center common to respective ringed traces. In this process, the upper chuck 13 is moved such that respective directions of ringed trace are alternately changed. Then, the process decides the start point of the fine alignment, where the maximum optical coupling between the optical device 3 and the external connecter is obtained.

Figure 3:
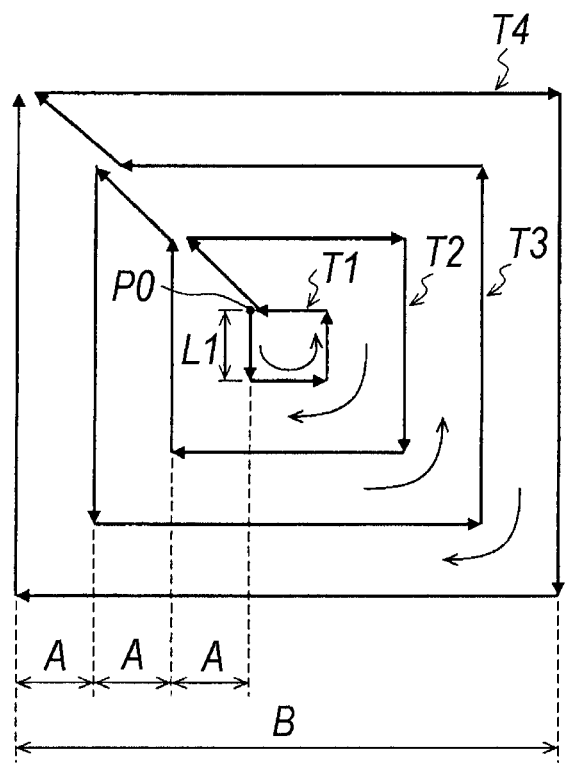
FIG. 3 shows a trace of the sleeve member in the rough alignment according to an embodiment of the present invention.

FIG. 3 specifically illustrates the process to move the upper chuck 13 described above. The chuck 13 first moves the sleeve member 2 on the J-sleeve 4 in counter clockwise from the start point P0 on the square trace T1 with a side length L1. Next, the upper chuck 13 moves the sleeve member 2 on another square trace T2 with a side greater than the former side, namely, L1+2A, with the center common to the trace T1 but the direction thereof in clockwise. Subsequently, the upper chuck 13 repeats the process to move the sleeve member 2 as increasing the side of the square trace but alternately switching the direction until the whole range of the rough alignment is covered.

The alignment process may carry out the fine alignment in the plane perpendicular to the optical axis Z from the position where the maximum optical coupling between the optical device 3 and the sleeve member 2 is obtained. After the fine alignment, the process may fix the holder 2c with the flat end 4b of the J-sleeve 4 by, for instance, the YAG laser welding or the resistance welding. Finally, adjusting the insertion depth of the optical device 3 into the bore 4c of the J-sleeve 4, the optical alignment along the optical axis Z may be performed. The optical device 3 may be fixed to the J-sleeve 4 by, for instance, the YAG laser welding and so on. Thus, the optical subassembly 1 may be completed.

Thus, the alignment process, in particular, the rough alignment between the optical device 3 and the sleeve member 2 in the plane the perpendicular to the optical axis Z, slides the sleeve member 2 on the J-sleeve 4 such that the sleeve member 2 traces counter squares by switching the direction of the trace; accordingly, the process may effectively prevent the J-sleeve 4 from rotating with respect to the optical device 3. A table below compares the conventional alignment process with that of the present embodiment. Devices under test, 1 to 5, were obtained by the conventional alignment process where the process slid the sleeve member 2 to trace contour squares in a spiral mode with the constant direction, while, devices, 6 to 10, were obtained by the process of the present embodiment. In the comparison, the pitch between contour squares was 20 μm and the whole range for the rough alignment had a side of 500 μm.

TABLE 1

Comparison of twisted angle

| DUT | twisted angle (degree) | Process |
|---|---|---|
| 1 | 13.60 | Conventional |
| 2 | 11.03 | |
| 3 | 11.93 | |
| 4 | 13.29 | |
| 5 | 11.87 | |
| 6 | −1.38 | Invented |
| 7 | 1.56 | |
| 8 | −1.25 | |
| 9 | −0.61 | |
| 10 | −1.35 | |

As the table above clearly indicates, the conventional alignment process causes the twisted angle around 12° for the J-sleeve 4 to the optical device 3, while, the process according to the embodiment described above shows the twisted angle only less than 2°. The former twisted angle is fatal, or causes an extreme degradation of the optical coupling between the optical device 3 and the sleeve member 2 due to the misdirection between the optical isolator and the polarization direction of the LD 3c. The process according to the present invention may effectively prevent the J-sleeve 4 from misdirecting.

In the foregoing detailed description, the method of the present invention has been described with reference to specific exemplary embodiments thereof. However, it will be evident that various modifications and changes may be made thereto without departing from the broader spirit and scope of the present invention. For instance, the embodiment described above concentrates on the optical device installing the LD 3c, but the invention may be applicable to an optical device installing a photodiode. Moreover, the process to slide the sleeve member 2 on the flat end 4b of the J-sleeve 4 traces the concentric squares; however, the sleeve member 2 may trace concentric circles or concentric rectangles. Therefore, the present specification and figures are accordingly to be regarded as illustrative rather than restrictive.

The invention claimed is:

1. A method of manufacturing an optical assembly that includes an optical device including a semiconductor laser diode, a J-sleeve including an optical isolator, and a sleeve member each arranged along an optical axis, the method comprising steps of:

holding the optical device on an apparatus for assembling the optical assembly;

holding the J-sleeve through the sleeve member such that the J-sleeve covers the optical device as being rotatable round the optical axis and the sleeve member is capable of sliding on an end surface of the J-sleeve finding, at a first alignment step, a relative position between the sleeve member and the J-sleeve at which the optical device and the sleeve member show a maximum optical coupling efficiency therebetween;

aligning the sleeve member optically with the J-sleeve in the plane around the position found by the first alignment such that the J-sleeve keeps a rotational angle around the optical axis; and aligning the J-sleeve optically with the optical device along the optical axis, wherein the step of finding the relative position includes a step to rotate the sleeve member around the optical axis on the end surface of the J-sleeve as tracing closed loops concentric to each other and alternating a direction of the rotation in a clockwise direction and a counter clockwise direction in respective closed loops, and wherein the number of rotations in the clockwise direction equals the number of rotations in the counter clockwise direction.

2. The method of claim 1, wherein the closed loops are concentric squares.

3. The method of claim 1, wherein the closed loops are concentric circles.

4. The method of claim 1, wherein the closed loops are concentric rectangles.

5. The method of claim 1, further including a step of, after aligning the sleeve member with the J-sleeve and before aligning of the J-sleeve with the optical device, fixing the sleeve member with the J-sleeve by YAG laser welding.

6. The method of claim 1, further including a step of, after aligning the J-sleeve with the optical device, fixing the J-sleeve with the optical device by YAG laser welding.

7. The method of claim 1, further including a step of, before aligning of the sleeve member with the J-sleeve, holding the J-sleeve with the sleeve member by magnetic force induced through the sleeve member from a chuck that supports the sleeve member.

8. The method of claim 1, wherein
the step of finding the relative positions includes a step to suppressing a rotation of the J-sleeve around the optical axis less that ±2° at an end of the finding step with respect to an original position of the J-sleeve at a beginning of the finding step.

\* \* \* \* \*